(12) United States Patent
Kotecha et al.

(10) Patent No.: US 9,264,538 B2
(45) Date of Patent: Feb. 16, 2016

(54) MOBILE SERVICES HOSTING

(71) Applicant: Verizon Patent and Licensing Inc., Basking Ridge, NJ (US)

(72) Inventors: Lalit R. Kotecha, San Ramon, CA (US); Bhaskar R. Gudlavenkatasiva, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 194 days.

(21) Appl. No.: 13/916,645

(22) Filed: Jun. 13, 2013

(65) Prior Publication Data

US 2014/0369266 A1 Dec. 18, 2014

(51) Int. Cl.
| | |
|---|---|
| *H04W 4/18* | (2009.01) |
| *H04W 4/00* | (2009.01) |
| *H04W 60/00* | (2009.01) |
| *H04L 29/06* | (2006.01) |
| *H04M 3/436* | (2006.01) |
| *H04W 84/10* | (2009.01) |
| *H04W 88/04* | (2009.01) |
| *H04W 92/18* | (2009.01) |

(52) U.S. Cl.
CPC ............ *H04M 3/436* (2013.01); *H04L 65/105* (2013.01); *H04L 65/1006* (2013.01); *H04L 65/1016* (2013.01); *H04L 65/1069* (2013.01); *H04W 4/003* (2013.01); *H04W 4/18* (2013.01); *H04W 60/00* (2013.01); *H04W 84/10* (2013.01); *H04W 88/04* (2013.01); *H04W 92/18* (2013.01)

(58) Field of Classification Search
USPC .......................................... 370/329
See application file for complete search history.

(56) References Cited

U.S. PATENT DOCUMENTS

| | | | | |
|---|---|---|---|---|
| 5,845,211 | A * | 12/1998 | Roach, Jr. | H04Q 11/0428 455/428 |
| 2006/0209802 | A1* | 9/2006 | Kang et al. | 370/352 |
| 2008/0307385 | A1* | 12/2008 | Dreiling et al. | 717/108 |
| 2009/0061907 | A1* | 3/2009 | Richardson et al. | 455/458 |
| 2014/0006494 | A1* | 1/2014 | George | 709/204 |

* cited by examiner

*Primary Examiner* — Michael Thier
*Assistant Examiner* — Yaotang Wang

(57) ABSTRACT

A mobile device stores a service-creation application and presents, via the service-creation application, a user interface to solicit a service definition for client mobile devices. The mobile device stores a service-engine for providing the service and announces availability of the service to the client mobile devices. The mobile device receives, in response to the announcing, a registration request from one of the client mobile devices and validates the registration request. The mobile device then provides, to the one of the client mobile devices, the service via the service engine.

20 Claims, 9 Drawing Sheets

US 9,264,538 B2

MOBILE SERVICES HOSTING

BACKGROUND

Most mobile devices are primarily used as communication and entertainment devices. With advancements in computer and wireless technologies, mobile devices are becoming very powerful, computing-intensive devices with networking capabilities that allow for additional uses.

DETAILED DESCRIPTION OF PREFERRED EMBODIMENTS

The following detailed description refers to the accompanying drawings. The same reference numbers in different drawings may identify the same or similar elements.

Systems and methods described herein may use a mobile device as a host to provide services to other mobile devices. Currently, customers typically go through a cumbersome process to create an application (or "app") that needs to be launched on the app market for other devices to use that particular app service. Such app services are developer-centric and not for the general public. According to implementations described herein, a mobile device (e.g., a smart phone or similar device), also referred to as a "host mobile device," can create services and host services for other mobile devices, also referred to as a "client mobile devices." The client mobile devices may pair with the host mobile device to consume services by subscribing and registering with the host mobile device.

As used herein, the term "mobile device" may generally refer to user equipment that provides access to a subscription-based wireless service. As used herein, the term "host mobile device" may generally refer to a mobile device used to provide services to other devices. As used herein, the term "client mobile device" may generally refer to a mobile device that is used to access services from a host mobile device. As used herein, the term "subscriber" may refer to a mobile device customer and/or one who operates a mobile device.

Figure 1:
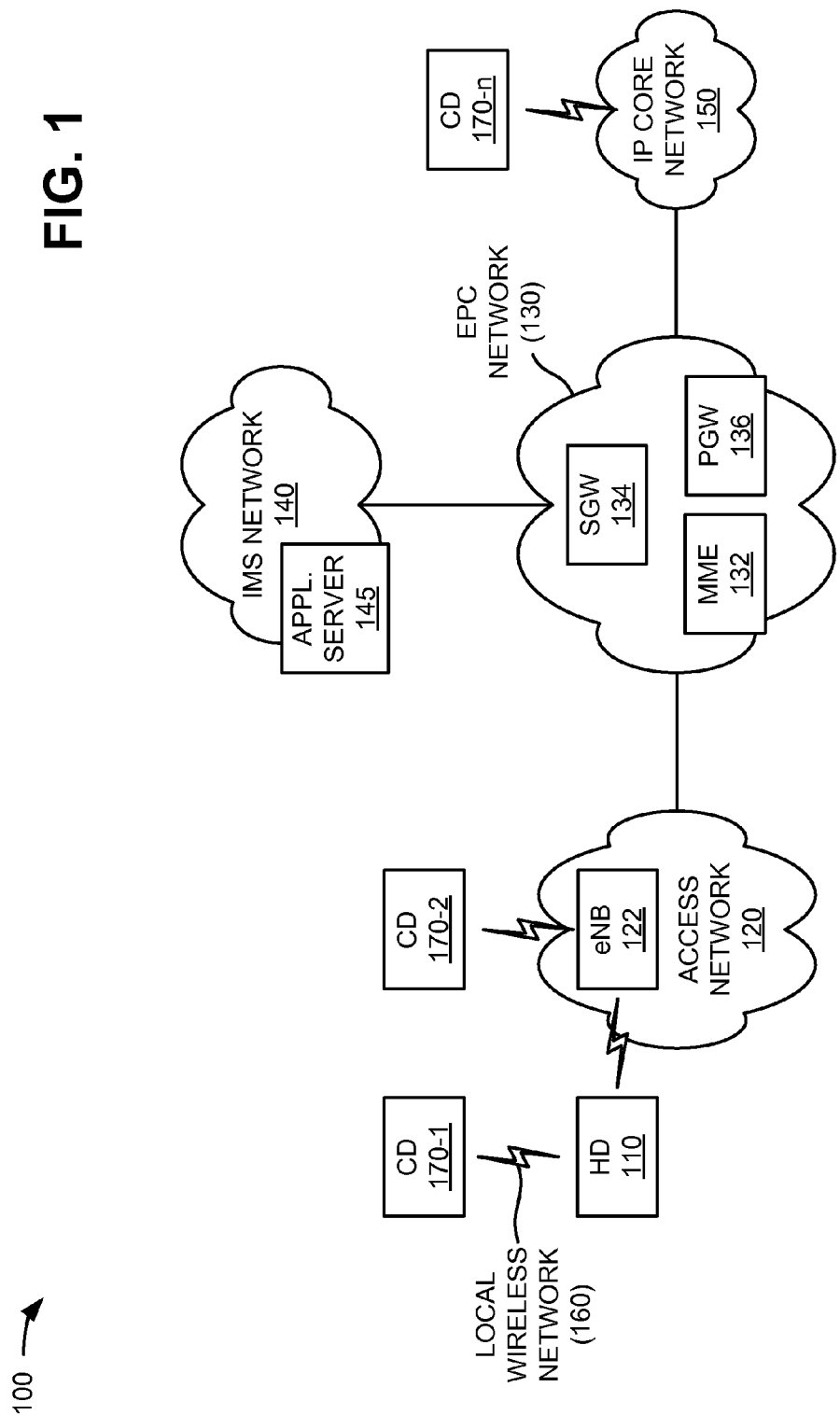
FIG. 1 is a diagram of an exemplary network in which systems and/or methods described herein may be implemented.

FIG. 1 is an exemplary network 100 in which systems and/or methods described herein may be implemented. As illustrated, network 100 may include a host mobile device (HD) 110, an access network 120, an evolved packet core (EPC) network 130, an IP multimedia subsystem (IMS) network 140, an IP core network 150, a local wireless network 160, and client mobile devices (CD) 170-1 through 170-n (referred to herein collectively as "portable devices 170" and generically as "portable device 170"). Access network 120 may include an eNodeB (eNB) 122. EPC network 130 may include a mobility management entity (MME) 132, a serving gateway (SGW) 134, and a packet data network (PDN) gateway (PGW) 136. IMS network 140 may include an application server 145. Devices and/or networks of network 100 may interconnect via wired and/or wireless links. According to other implementations, different types of networks may be used.

Host mobile device 110 may include a mobile phone, a smart phone, a tablet computer, a laptop computer, a personal digital assistant (PDA), or another type of portable communication device. As another example, host mobile device 110 may include a desktop computer, a telephone device with video capability, and/or another type of computation or communication device. In an exemplary implementation, host mobile device 110 may include a device that is capable of communicating over access network 120, EPC network 130, IMS network 140, and/or IP core network 150. Host mobile device 110 may also be capable of communicating via a local wireless network (e.g., local wireless network 160). In exemplary implementations described herein, host mobile device 110 may have the capability to conduct multiple, simultaneous sessions using a wireless service (e.g., a broadband cellular service), such as conducting multiple VoIP calls, video-telephony calls, or internet sessions. Also, in implementations described herein, host mobile device 110 may be provided with a service creator application that provides a user interface to develop service offerings, advertise services, and provide services to authorized client mobile devices 170.

Access network 120 may include a wireless communications network that connects subscribers (e.g., host mobile device 110) to a service provider (e.g., EPC network 130). In one example, access network 120 may include a long-term evolution (LTE) network. In other implementations, access network 120 may employ other wireless network standards such as 3rd Generation Partnership Project (3GPP) 3G/4G standards, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or future wireless access network standards. Generally, access network 120 may include a radio access network capable of supporting high data rate, low latency, packet optimization, large capacity and coverage, etc. Terminology used herein may refer to particular network standards, such as LTE, for simplicity, but is not intended as a limitation to any particular wireless standard.

eNB 122 may include one or more computation and/or communication devices that operates according to the LTE standard. eNB 112 may receive voice and/or data from MME 132 and/or SGW 134 and wirelessly transmit that voice and/or data to host mobile device 110. eNB 122 may also include one or more devices that wirelessly receive voice and/or data from host mobile device 110 and transmit that voice and/or data to one of MME 132 and/or SGW 134 or to other mobile devices 110. eNB 122 may combine the functionalities of a base station and a radio network controller (RNC) provided in 2G or 3G radio access networks.

EPC network 130 may include core network architecture of the 3rd Generation Partnership Project (3GPP) LTE wireless communication standard. In one example, EPC network 130 may include an all-IP packet-switched core network that supports high-speed wireless and wireline broadband access technologies. In another example, EPC network 130 may provide packet-switched voice services (e.g., which are traditionally circuit-switched) using IMS network 140.

MME 132 may include one or more communicative devices that operate according to the LTE standard of an MME. MME 132 may be responsible for idle mode tracking and paging procedures (e.g., including retransmissions) for host mobile device 110. MME 132 may be involved in a bearer activation/deactivation process (e.g., for host mobile device 110) and may choose a SGW (e.g., SGW 134) for host mobile device 110 during an initial attach and at a time of intra-LTE handover. MME 132 may provide a control plane function for mobility between LTE and different access networks (e.g., a different access network 120/eNB 122).

SGW 134 may include one or more communicative devices that operate according to the LTE standard of an SGW. SGW 134 may include one or more data transfer devices (or network devices), such as a gateway, a router, a switch, a firewall, a network interface card (NIC), a hub, a bridge, a proxy server, an optical add-drop multiplexer (OADM), or some other type of device that processes and/or transfers data. In one implementation, SGW 134 may route and forward user data packets, may act as a mobility anchor for a user plane during inter-eNB handovers, and may act as an anchor for mobility between LTE and other 3GPP technologies. SGW 134 may include a local resource timer to manage network resources. SGW 134 may manage and store contexts associated with host mobile device 110 (e.g., parameters of an IP bearer service, network internal routing information, etc.).

PGW 136 may include one or more communicative devices that operate according to the LTE standard of a PGW. PGW 136 may include one or more data transfer devices (or network devices), such as a gateway, a router, a switch, a firewall, a NIC, a hub, a bridge, a proxy server, an OADM, or some other type of device that processes and/or transfers data. In one exemplary implementation, PGW 136 may provide connectivity of host mobile device 110 to external packet data networks (PDNs, e.g., in IP core network 150) by being a traffic exit/entry point for host mobile device 110. Host mobile device 110 may simultaneously connect to more than one PGW 136 for accessing multiple PDNs. PGW 136 may perform policy enforcement, packet filtering for each user, charging support, lawful intercept, and packet screening. PGW 136 may also act as an anchor for mobility between 3GPP and non-3GPP technologies.

IMS network 140 may include an architectural framework or network (e.g., a telecommunications network) for delivering IP multimedia services. For example, IMS network 140 may include a home subscriber server (HSS) and a policy and charging rules function (PCRF) (not illustrated). In one implementation, the HSS may interface with host mobile device 110, SGW 134, PGW 136, and/or application server 145 and may provide information to application server 145 that enables application server 145 to communicate with host mobile device 110 using IP-based communication protocols. The PCRF may perform operations that enforce network policies associated with a communication session with host mobile device 110.

Application server 145 may include one or more server devices, or other types of computational or communicative devices that gather, process, search, and/or provide information in a manner described herein. In one exemplary implementation, application server 145 may provide applications, data, and/or services to host mobile device 110. In one example, application server 145 may provide a service creator application to host mobile device 110. Additionally, in another implementation, application server 145 may provide a service interface client application to client mobile devices 170 to facilitate communications described herein. Application server 145 may be a distributed component. For example, although shown in FIG. 1 within IMS network 140, in other implementations some or all features of application server 145 may be included in devices that communicate via IP core network 150 and EPC network 130.

IP core network 150 may include one or more networks (e.g., a local area network (LAN), a wide area network (WAN), a metropolitan area network (MAN), the Internet, etc.) capable of communicating with host mobile device 110 and operating according to the Internet Protocol.

Local wireless network 160 may employ one or more short-range wireless communication standards for a wireless personal area network (WPAN) and/or a wireless local area network (WLAN). Local wireless network 160 may include, for example, IEEE 802.15 (e.g., Bluetooth) and IEEE 802.11x (e.g., Wi-Fi) networks, although other local wireless network technologies may be used. In other implementations, host mobile device 110 may employ different types of local wireless networks with different client mobile devices 170 (e.g., multiple WPANs, simultaneous WLAN and WPAN, etc.).

Client mobile device 170 may include a computational or communicative device that may use local wireless network 160 to communicate with host mobile device 110. In one implementation, client mobile device 170 may include the same hardware as host mobile device 110. In other implementations, client mobile device 170 may include, for example, a mobile phone without smart phone capabilities or a consumer electronics device (e.g., with Wi-Fi capability) that is equipped with voice capability and local wireless connectivity.

In FIG. 1, the particular arrangement and number of components of network 100 are illustrated for simplicity. In practice there may be more mobile devices 110, access networks 120, EPC networks 130, IMS networks 140, application servers 145, IP core networks 150, local wireless networks 160, and client mobile devices 170. For example, there may be thousands of host mobile devices 110 and/or client mobile devices 170.

Figure 2:
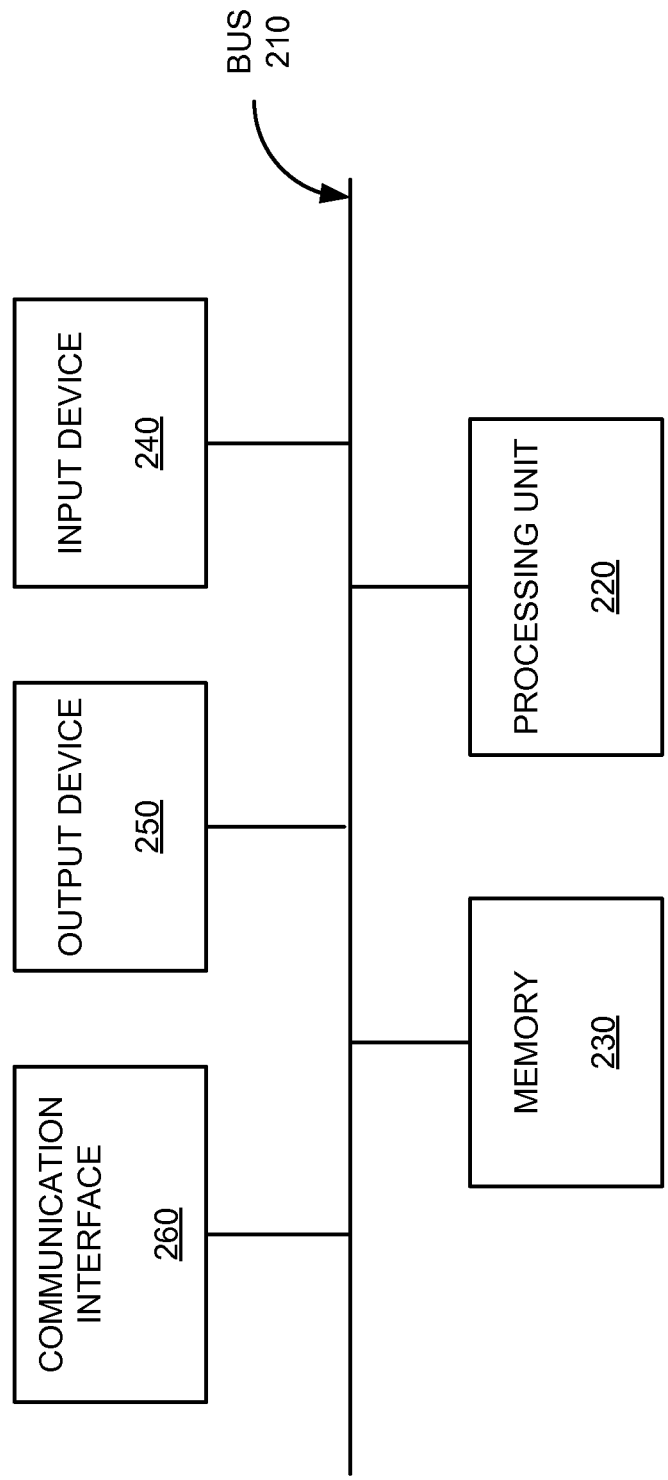
FIG. 2 is a diagram of exemplary components of a device that may correspond to one of the devices of the network depicted in FIG. 1.

FIG. 2 is a diagram illustrating exemplary components of a device 200. Each of host mobile device 110, eNB 122, MME 132, SGW 134, PGW 136, application server 145, and client mobile device 170 may be implemented/installed as a combination of hardware and software on one or more of device 200. As shown in FIG. 2, device 200 may include a bus 210, a processing unit 220, a memory 230, one or more input devices 240, one or more output devices 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits a user to input information to device 200, such as a keyboard, a keypad, a mouse, a pen, a microphone, one or more biometric mechanisms, and the like. Output device 250 may include a device that outputs information to the user, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions stored in a computer-readable medium, such as memory 230. A computer-readable medium may include a non-transitory tangible memory device. A memory device may be implemented within a single physical memory device or spread across multiple physical memory devices. The software instructions may be read into memory 230 from another computer-readable medium or read into memory 230 from another device via communication interface 260. The software instructions stored in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than those depicted in FIG. 2. As an example, in some implementations, a display may not be included in device 200. In these situations, device 200 may be a "headless" device that does not include input device 240. Alternatively, or additionally, one or more components of device 200 may perform one or more other tasks described as being performed by one or more other components of device 200.

Figure 3:
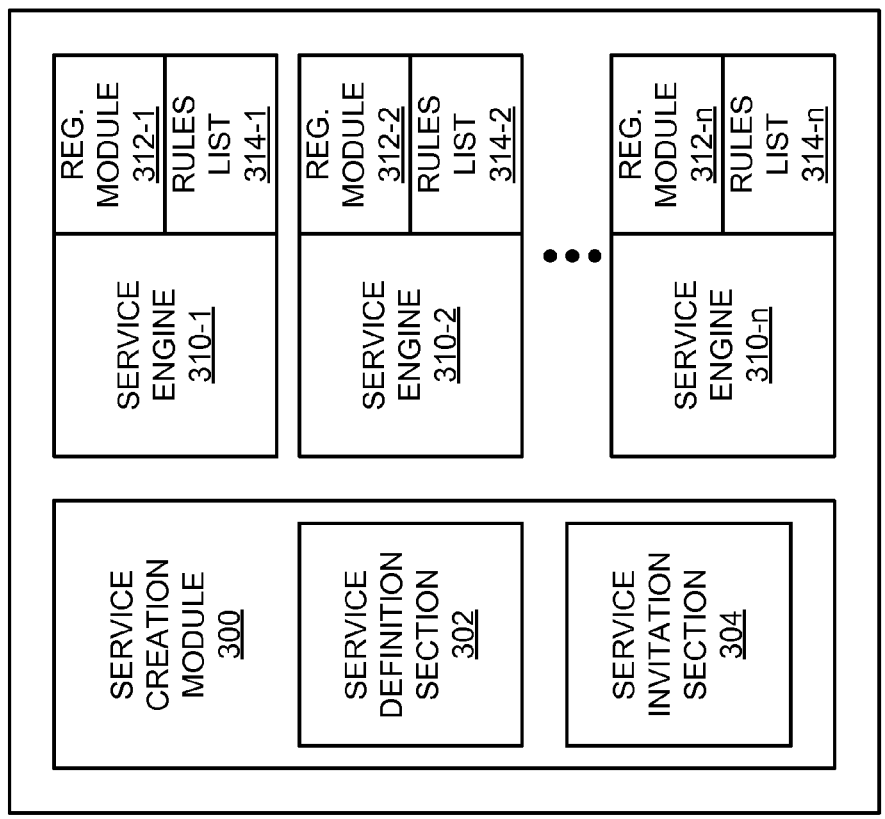
FIG. 3 is a diagram of exemplary functional components of a host device of the network of FIG. 1.

FIG. 3 is a block diagram of exemplary functional components of host mobile device 110. In one implementation, the functions described in connection with FIG. 3 may be performed by one or more components of device 200 (FIG. 2). Some or all of the functional blocks of FIG. 3 may be included, for example, in a service creator application (e.g., software), stored in memory 230 and executed by processing unit 220. The service creator application may be provided to host mobile device 110, for example, as a download from a remote server (e.g., application server 145). Functional components of host mobile device 110 may generally allow host mobile device 110 to create and offer services to client mobile devices 170. As shown in FIG. 3, host mobile device 110 may include a service creation module 300, service engines 310-1 through 310-n (referred to herein generically as "service engine 310").

Service creation module 300 may provide an interface to generate service engines 310. In one implementation, service creation module 300 may include a service definition section 302 and a service invitation section 304. Service creation module 300 may generally provide a user interface to enable a user to create an application and/or service for consumption by client mobile devices 170. Services created via service creation module 300 may, in turn, be implemented by one of service engines 310. Service creation module 300 may also manage communications related to multiple service engines 310. For example, service creation module 300 may provide notifications of termination and/or interruption of services to client mobile devices 170 associated with any service engine 310. In one aspect, if service creation module 300 detects a shutdown command for host mobile device 110, service creation module 300 may provide a service interruption announcement to any paired client mobile devices 170. In another aspect, service creation module 300 may detect a handoff to a cellular coverage area that cannot support services and provide the service interruption announcement. In another implementation, termination and/or interruption notices may be provided via individual service engines 310.

Service definition section 302 may include an interface to enable a user to define a service. In one implementation, service definition section 302 may include a programming interface or graphical user interface to set up a service. In one aspect, services may be tailored for a small group of mobile devices (e.g., an individual or family group). In other aspects, services may be made available to larger groups of devices. Service definition section 302 may generally be used to program services implemented by service engines 310. Service definition section 302 may, for example, solicit functional specifications from a user that may be converted into executable code. In one aspect, the functional specifications may be provided to application server 145 for conversion. In one implementation, service definition section 302 may include a menu-driven interface to select from a group of available features and combinations. In another implementation, service definition section 302 may be configured to accept code, such as peer generated code. For example, host mobile device users may share code via social network platforms, dedicated forums, or on an ad hoc basis. The shared code may be inserted, for example, as a text file into service definition setion. In still another implementation new XML code may be entered (e.g. via a text input) to implement particular services. In still another application, service definition section 302 may communicate with application server 145 to provide additional guidance to configure a service definition.

Service invitation section 304 may provide a user interface to identify particular devices or groups of devices to receive services (e.g., a service indicated in service definition section 302). In one implementation, service invitation section 304 may allow a user of host mobile device 110 to identify actual devices (e.g., based on a mobile directory number (MDN) or another identifier associated with a particular client mobile device 170). In another implementation, service invitation section 304 may provide access to accounts registered with application server 145. In still other implementations, service invitation section 304 may allow a user to import information from a contact list or provide an e-mail address. Service invitation section 304 may provide a services announcement to devices of interest (e.g., potential client mobile devices 170) via an SMTP message, a POP message, etc.

Service engine 310 may provide a particular service to registered client mobile devices 170 based on instructions in service definition section 302. Generally, in one aspect, service engine 310 may enable host mobile device 110 to act as a web server to provide services to paired client mobile devices 170. In one implementation, service engine 310 may be associated with a URL that is resolved by a DNS server to a particular mobile IP address for host mobile device 110.

Services provided by service engine 310 may include, for example, firewall-type services, caller ID masking services, location-based services, etc., which may be targeted for a particular mobile device or group of mobile devices. In some cases, services may include utility-type services that add functionality to a client mobile device 170. In other cases, services may include monitoring, filtering, and/or control services to restrict or protect client mobile device 170 (or its user). According to one implementations described herein, services provided by service engine 310 may be tailored for particular small groups of client mobile devices 170 or even individual client mobile devices 170. Thus, service engine 310 may provide services with a less complex process and with simplified deployment compared to, for example, a traditional hosted service platform.

In one implementation, as shown in FIG. 3, each service engine 310 may include a registration ("reg.") module 312 to track users for the particular service associated with the particular service engine 310. Service engine 310 may receive registration requests based on a link provided in the service announcement. In one aspect, the registration module 312 of service engine 310 may enable a user of host device 110 to assign credentials (e.g., an account name and password) for a particular client mobile device 170. In another aspect, the registration module 312 of service engine 310 may request credentials from a client mobile device 170. The registration process may be automated (e.g., without requiring intervention from the user of host mobile device 110) or may require explicit user authorization (e.g., may solicit input from the user of host mobile device 110). Service engine 310 may also receive login requests from client mobile devices 170 and verify credentials from client mobile devices 170.

In another aspect, the registration module 312 may also include configuration of payment processing. For example, the registration module 312 for each service engine 310 may solicit a payment mechanism for fee-based services. The payment mechanism may include, for example, a credit card or electronic payment information from a user of client mobile device 170. Upon successful registration for services by client mobile device 170, service engine 310 may provide services for the client mobile device 170.

In another aspect, service engine 310 may include a rules list 314 to manage services provided to client mobile devices 170. The rules list 314 may include, for example, rules related to the particular service offered via service engine 310, such as internet rules, location-based rules, time-based rules, contact rules, etc. For example, internet rules may include a compilation of rules for a particular client mobile device 170, such as a child's smart phone. The internet rules may enable, for example, restrictions and/or firewall capabilities such as parental controls or other limits that may be associated with a particular user (e.g., a user identified in the corresponding registration module 312). Location-based rules may prevent the location of a client mobile device 170 from being identified. Additionally, or alternatively, the location-based rules may enable/disable certain features of service engine 310, as applied to client mobile device 170, at particular locations (e.g., at school). Similarly, time-based rules may enable/disable certain features of service engine 310, as applied to client mobile device 170, at particular times (e.g., bed-time, school hours, etc.). Contact rules may include lists of blocked outgoing/incoming callers, cross-referenced contact information (e.g., phone number, e-mail address, etc.), or other contact information.

Although FIG. 3 shows exemplary functional components of host mobile device 110, in other implementations, host mobile device 110 may contain fewer, different, or additional functional components than depicted in FIG. 3.

Figure 4:
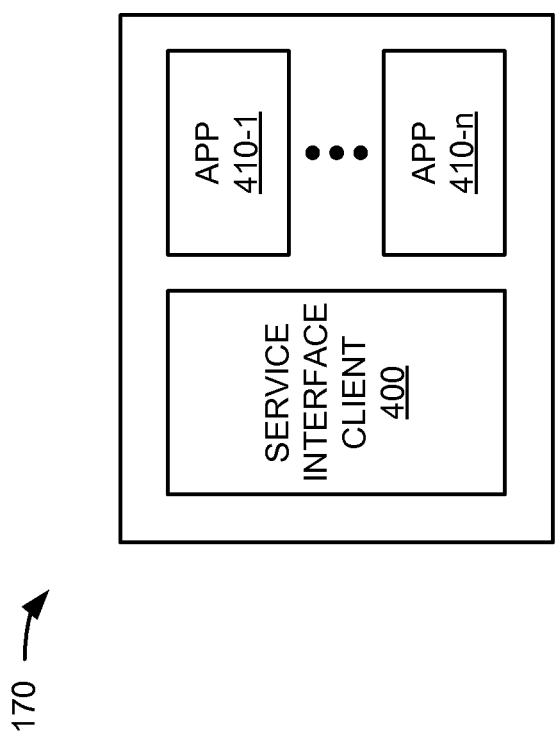
FIG. 4 is a diagram of exemplary functional components of a mobile device of the network of FIG. 1.

FIG. 4 is a block diagram of exemplary functional components of client mobile device 170. In one implementation, the functions described in connection with FIG. 4 may be performed by one or more components of device 200 (FIG. 2). As shown in FIG. 4, client mobile device 170 may include a service interface client 400 and applications 410-1 through 410-*n* (referred to herein collectively as "applications 410" and generically as "application 410").

Service interface client 400 may enable registration, notification and/or setup of services for client mobile device 170. In one implementation, service interface client 410 may provide a user interface to register for a service (e.g., voice, video, communication, Internet services from host mobile device 110) and submit credentials (e.g., credentials provided by host mobile device 110) to host mobile device 110. In one implementation, service interface client 400 may receive and implement signals (e.g., SIP-based signals) to set up sessions for services provided to client mobile device 170 via host mobile device 110).

Applications 410 may invoke particular services from host mobile device 110. For example, applications 410 may be invoked to trigger services from a particular service engine 310 residing on host mobile device 110. In one aspect, applications may include, for example, communication applications to manage voice and data communications from client mobile device 170. In another aspect, applications 410 may provide additional functionality to client mobile device 170, such as access to e-mail capabilities that are resident on host mobile device 110.

Figure 5:
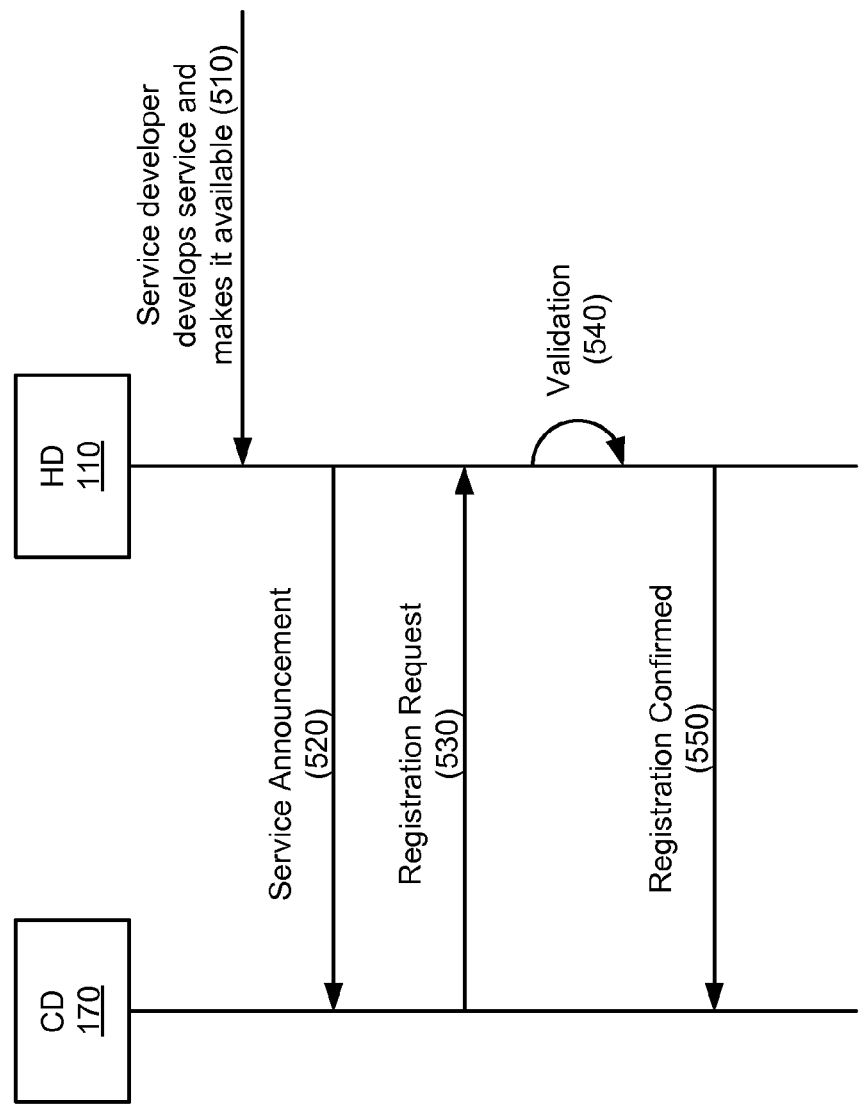
FIG. 5 is a diagram of exemplary communications among devices in a portion of the network of FIG. 1.

Although FIG. 4 shows exemplary functional components of client mobile device 170, in other implementations, client mobile device 170 may contain fewer, different, or additional functional components than depicted in FIG. 5. For example, client mobile device 170 may also include a web browser.

FIG. 5 is a diagram of exemplary communications among components of a portion 500 of network 100 according to an implementation described herein. Communications in FIG. 5 may illustrate a service creation process. As shown in FIG. 5, network portion 500 may include host mobile device 110 and client mobile device 170.

A user of host mobile device 110 may develop a service, as indicated by reference number 510. For example, a user (e.g., a service developer) may employ service creation module 300 to develop a service for a particular group of users or a generic group of users of client mobile devices 170. For example, after downloading service creation module 300 from application server 145, the user may select from different service creation modules designed to configure a specific service (e.g., a call forwarding service, a parental control service, etc.). In one implementation, service creation module 300 may provide a service configuration wizard GUI to walk a user through the configuration in a step-by-step process.

Base on the user input, host mobile device 110 (e.g., service creation module 300) may define a service engine (e.g., service engine 310) to host the particular service on host mobile device 110. The user of host mobile device 110 may also identify, for example, one or more client mobile devices 170, user accounts, and/or groups that may be notified of the available service.

Based on the user input, host mobile device 110 may generate a service announcement to the particular client mobile devices 170, user accounts, and/or groups identified during service development 510. For example, as shown in FIG. 5, host mobile device 110 may provide a service announcement 520 in the form of an e-mail notification, a text message, or another type of service. In one implementation, service announcement 520 may include a link (e.g., a URL) to enable client mobile device 170 to submit a registration request to host mobile device 110.

Client mobile device 170 may receive service announcement 520 and present service announcement 520 to a user of client mobile device 170. In one implementation, service announcement 520 may be presented via service interface client 400. In another implementation, service announcement 520 may be presented to the user via another application, such as an e-mail application, text application, etc. (not shown).

After receiving user input indicating a desire to receive the service promoted in service announcement 520, client mobile device 170 may generate a registration request 530. In one implementation, client mobile device 170 may use the URL provided in service announcement 520 to initiate session-based communications with host mobile device 110. Registration request 530 may include, for example, a SIP protocol request or another request directed to a particular service engine (e.g., service engine 310) associated with service announcement 520. In another implementation, registration request 530 may include user credentials (e.g., a user ID and/or password) for client mobile device 170.

Host mobile device 110 may receive registration request 530 and may validate client mobile device 170 to receive services, as indicated by reference number 540. For example, host mobile device 110 (e.g., service engine 310 associated with service announcement 520) may automatically verify registration request 530 based on credentials provided in registration request 530. In another implementation, host mobile device 110 may present validation request to a user of host mobile device 110 for verification. In one aspect, validation 540 may include confirming a user name and password for providing access, by client mobile device 170, to services from the particular service engine 310 on host mobile device 110. In another aspect, validation 540 may include establishing a charging method for services provided to client mobile device 170. For example, validation 540 may include providing a credit card or electronic payment information in accordance with fees for services provide via host mobile device 110/service engine 310.

Assuming successful validation, host mobile device 110 may provide a registration confirmation 550 to client mobile device 170. For example, service engine 310 of host mobile device 110 may provide a successful registration indication to client mobile device 170. In one aspect, registration confirmation 550 may include a data download for client mobile device 170 to receive an application (e.g., application 420) associated with service announcement 520.

Although FIG. 5 shows exemplary components of network portion 500, in other implementations, network portion 500 may include different components and/or additional components than depicted in FIG. 5. Alternatively, or additionally, one or more components of network portion 500 may perform one or more other tasks described as being performed by one or more other components of network portion 500.

Figure 6:
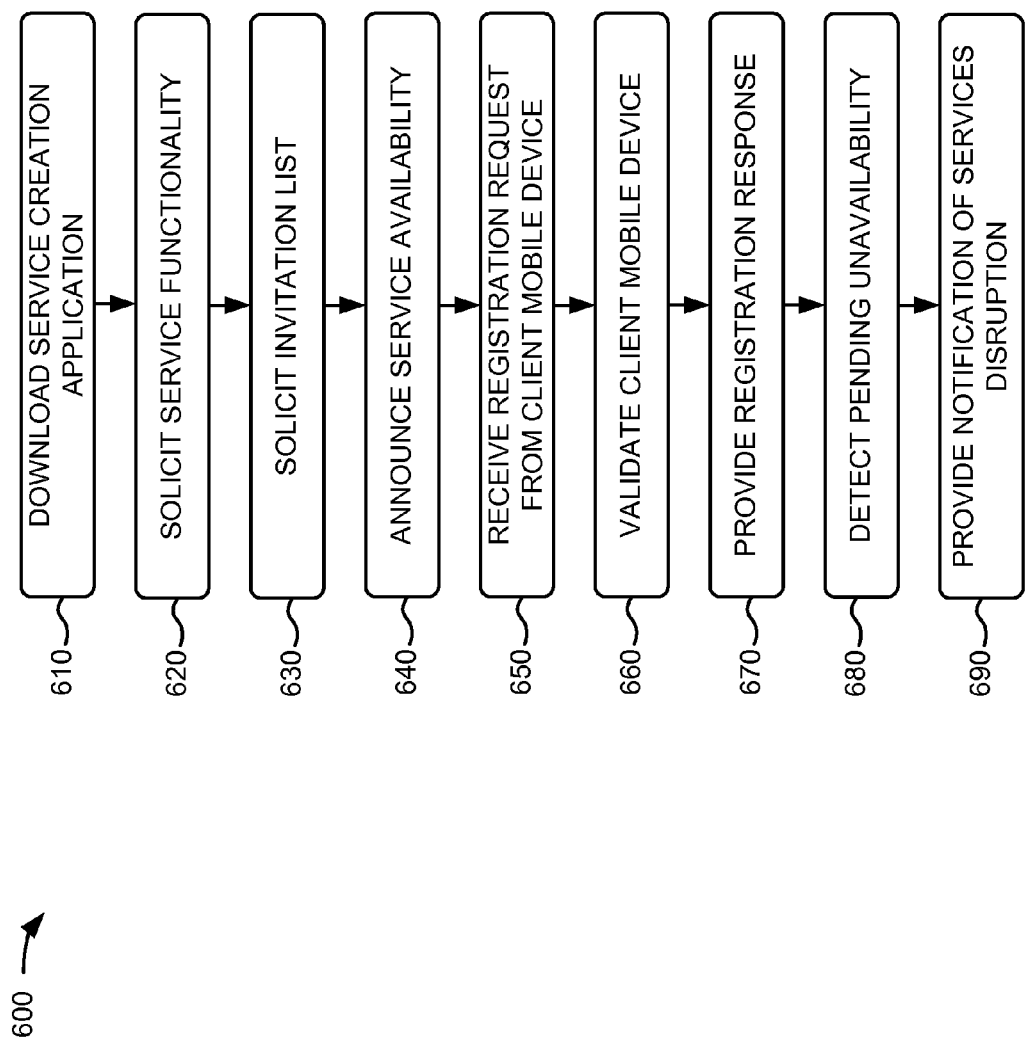
FIG. 6 is a flow chart of an exemplary process for creating access to services from a host mobile device according to an implementation described herein.

FIG. 6 is a flow chart of an exemplary process 600 for creating access to services from a host mobile device according to an implementation described herein. In one implementation, process 600 may be performed by host mobile device 110. In another implementation, some or all of process 600 may be performed by host mobile device 110 in conjunction with one or more other devices. For example, host mobile device 110 may perform process 600 in conjunction with application server 145. Process 600 is described with reference to components illustrated in figures described above.

As shown in FIG. 6, process 600 may include downloading a service creation application (block 610), soliciting a service functionality (block 620), and soliciting an invitation list (block 630). For example, host mobile device 110 may download (or otherwise install) service creation module 300. Service creation module 300 may solicit, from a user, particular services to be provided. For example, service definition section 302 may provide a graphical user interface to permit a user of host mobile device 110 to define a service. Service invitation section 304 may provide a user interface to identify particular devices or groups of devices targeted to receive the services defined in service definition section 302.

Process 600 may also include announcing the service availability to the invitation list (block 640) and receiving a registration request from a client mobile device (block 650). For example, host mobile device 110 may provide service announcement 520 with a link to enable client mobile device 170 to submit a registration request to host mobile device 110. Client mobile device 170 may use the link provided in service announcement 520 to initiate registration request 530.

Process 600 may further include validating the client mobile device (block 660) and providing a registration response (block 670). For example, host mobile device 110 may receive registration request 530 and may validate client mobile device 170 to receive services. Assuming successful validation, host mobile device 110 may provide a registration confirmation 550 to client mobile device 170. Registration confirmation 550 may include a data download for client mobile device 170 to receive an application (e.g., application 420).

In one implementation, process 600 may also include detecting a pending unavailability (block 680) and providing a notification of service disruption (block 690). For example, service creation module 300 may detect a shutdown command for host mobile device 110 and provide a service interruption announcement to paired client mobile devices 170.

Figure 7:
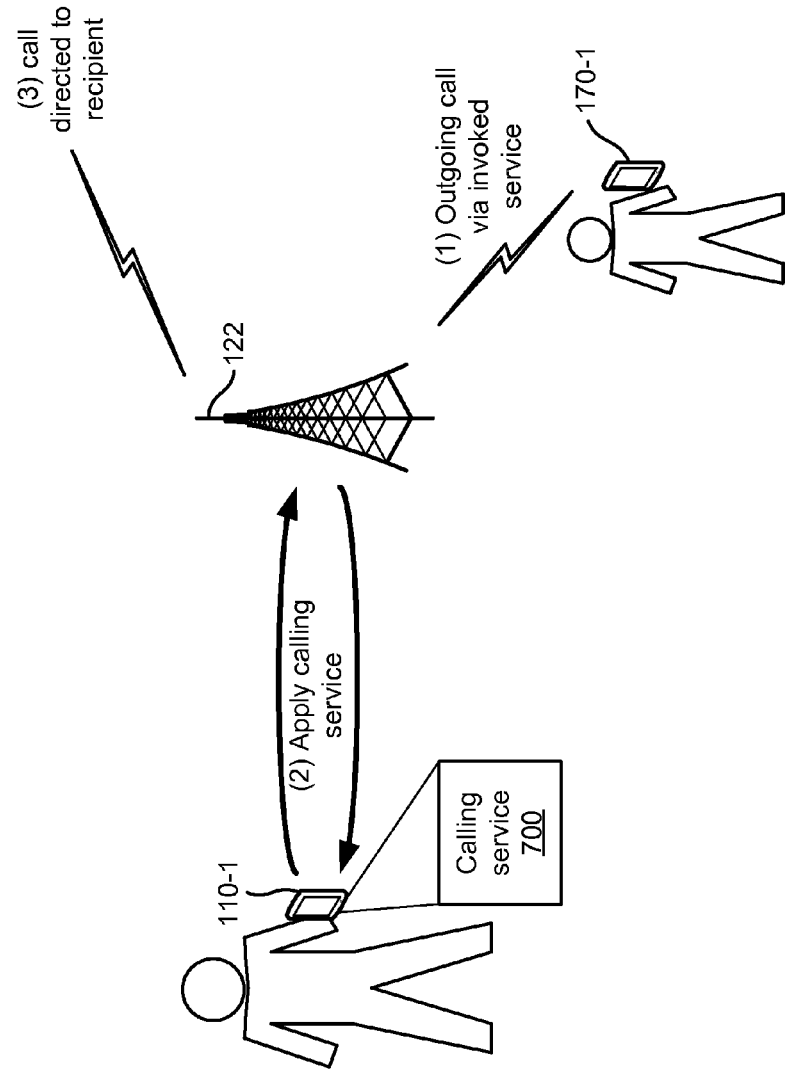
FIGS. 7-9 are diagrams of exemplary use cases according to implementations described herein.
Figure 8:
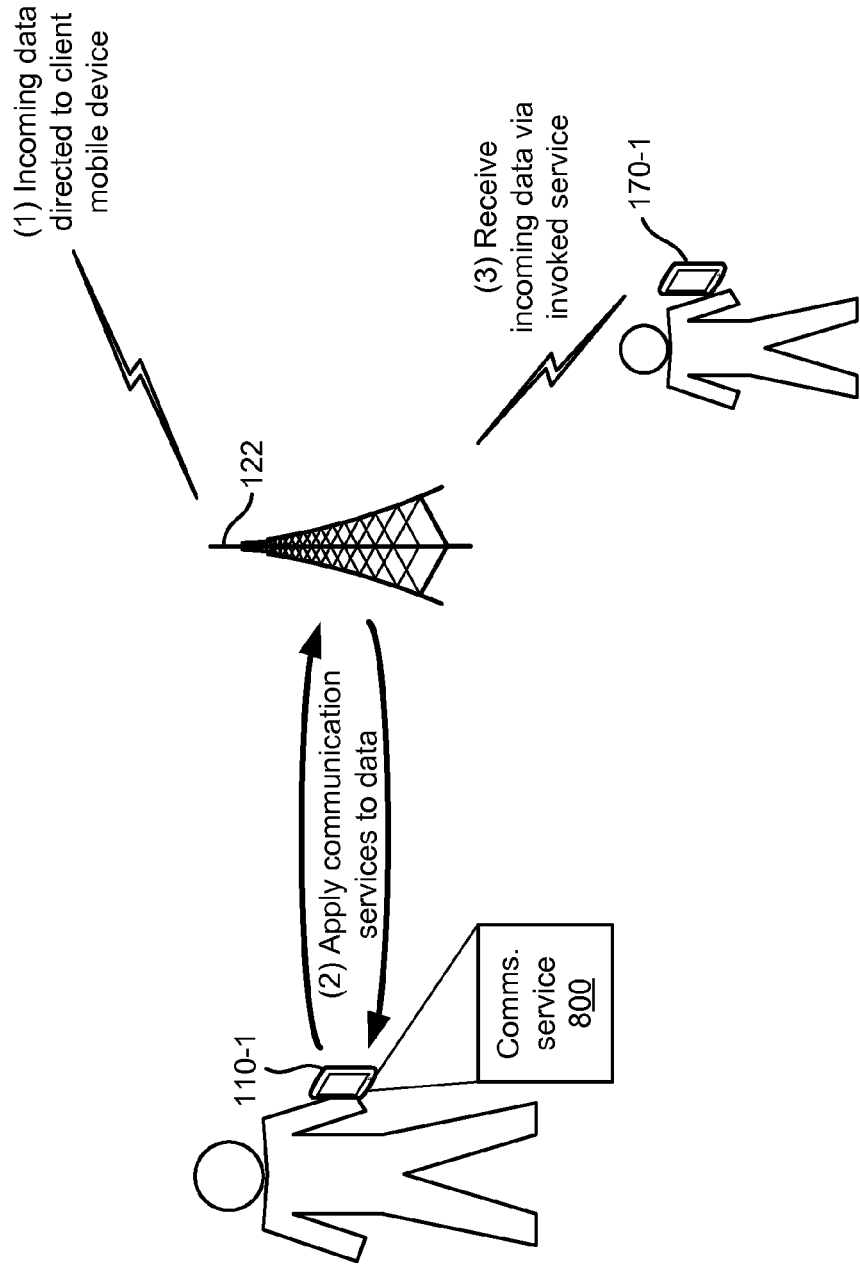
Figure 9:
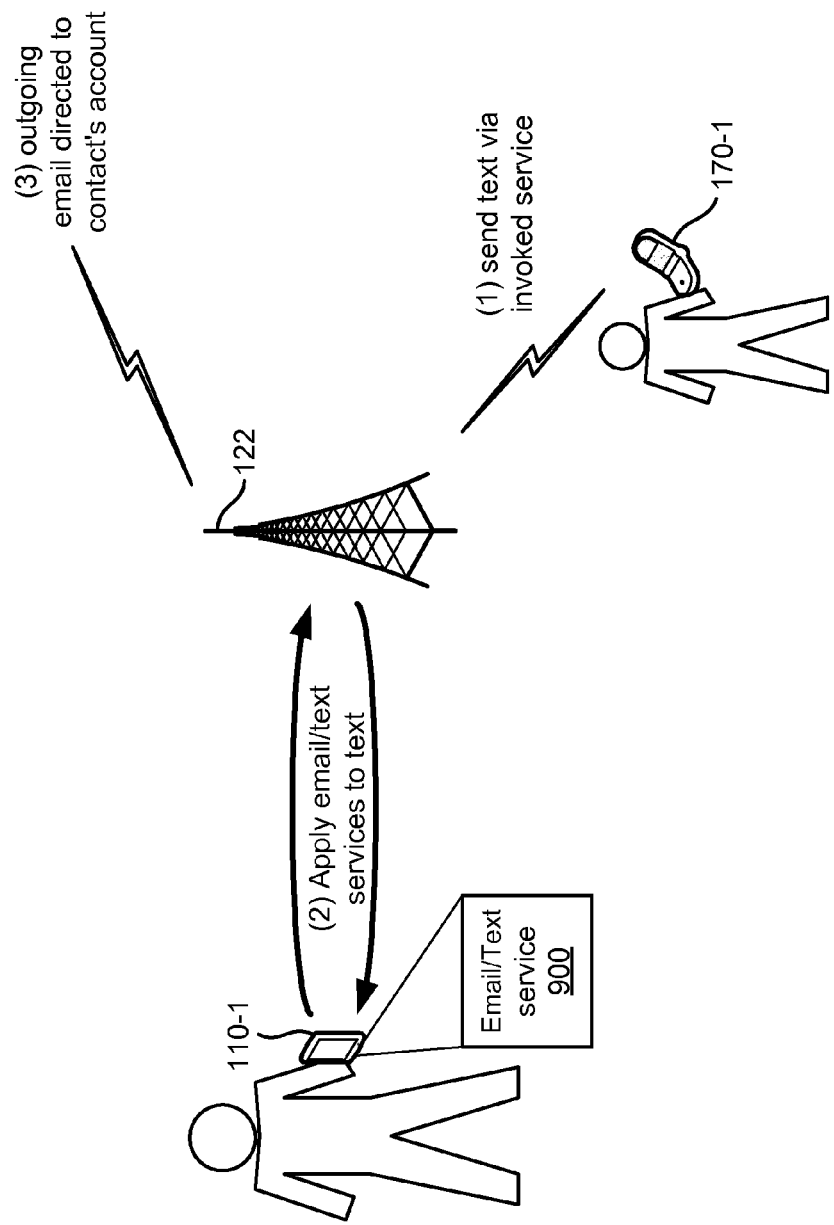

FIGS. 7-9 provide diagrams of exemplary use cases according to implementations described herein. Referring to FIG. 7, assume a parent uses host mobile device 110-1 to develop a service for a child's client mobile device 170-1. The service includes a call receiving, forwarding, and dialing service 700. Client mobile device 170-1 may invoke service 700 on host mobile device 110-1 to make outgoing calls. Thus, all communications from client mobile phone 170-1 can remain anonymous. The service may also include other features, such as incorporating a blocked number list or to restrict calls to non-emergency phone numbers (or another subset of phone numbers) during certain periods (e.g., school hours, etc.). For example, in other implementations, service 700 may be used to forward a call from client mobile device 170-1, forward a call to client mobile device 170-1, block a call from client mobile device 170-1, or block a call to client mobile device 170-1.

Referring to FIG. 8, in another use case, assume the parent uses host mobile device 110-1 to develop a communications pass-through service for the child's client mobile device 170-1. Client mobile device 170-1 may invoke service 800 on host mobile device 110-1. Generally, the pass-through service 800 may receive outgoing communications from client mobile device 170-1; apply, to the outgoing communications, a particular service; and forward the outgoing communications to an intended recipient. The parent's host mobile device 110-1 can act as a gateway for all communication needs of the child's client mobile phone 170-1. Thus, host mobile device 110-1 may act as a firewall, implement parental controls, enforce time-based restrictions, etc. for the child's client mobile device 170-1. Restrictions may apply, for example, to multiple communication types (e.g., e-mail, instant messages, voice calls, video calls, etc.), Internet browsing, and/or web-based services. The parent may use host mobile device 110-1 to modify access restrictions of service 800 (e.g., via inputting changes on host mobile device 110-1) to remotely adjust communication access for the child's client mobile phone 170-1.

Referring to FIG. 9, in another use case, assume the parent uses host mobile device 110-1 to develop a utility service for a grandparent's client mobile device 170-2. More particularly, as an example of a utility service, service 900 may provide e-mail capability to a client mobile device 170-2 that does not include e-mail capabilities. Service 900 may, for example, be configured to receive text messages from client mobile device 170-2 and forward the text messages as e-mail messages. Conversely, service 900 may receive e-mail messages for the child's e-mail account and forward the e-mails to client mobile device 170-2 as text messages without special attributes supported by the e-mail service. In another implementation, pre-programmed e-mail text may be generated by host mobile device 110-1 based on receiving an assigned text and/or key code from the grandparent's client mobile device 170-2. Client mobile device 170-2 may invoke service 900 on host mobile device 110-1. The grandparent's client mobile device 170-2 may generate/send a text message for a particular contact. Host mobile device 110-1 may receive the text message, convert the text messaged into an e-mail format, identify a corresponding e-mail address for the contact (e.g., based on a previously populated look-up table), and send the message as an e-mail from an e-mail account associated with the user of client mobile device 170-2 to the contact.

In systems and/or methods described herein, a host mobile device may store a service-creation application and may present, via the service-creation application, a user interface to solicit a service definition for client mobile devices. The host mobile device may store a service-engine for providing the service and may announce availability of the service to the client mobile devices. The host mobile device may receive, in response to the announcing, a registration request from one of the client mobile devices and may validate the registration request. The host mobile device may then provide, to the one of the client mobile devices, the service via the service engine.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a host mobile device, a service-creation application;
   presenting, by the host mobile device and via the service-creation application, a user interface to define a service enabling the host mobile device to act as a web server to provide services to paired client mobile devices;
   soliciting, via the service-creation application and from a user, functional specifications of the service;
   obtaining, by the host mobile device, executable code for implementing the functional specifications of the service;
   storing, in a memory of the host mobile device, a service-engine for hosting the service, wherein the service-engine provides the service based on the executable code;
   announcing, by the host mobile device, availability of the service;
   receiving, by the host mobile device and in response to the announcing, a registration request from one of the client mobile devices;
   validating, by the host mobile device, the registration request;
   providing, by the host mobile device and to the one of the client mobile devices, the service via the service-engine, wherein the service adds a functionality to the one of the client mobile devices;
   detecting, by the host mobile device, a handoff to a cellular coverage area that cannot support the service; and
   providing, by the host mobile device and to the one of the client mobile devices a service interruption announcement.

2. The method of claim 1, wherein the presenting the user interface to define the service includes:
   soliciting, via the user interface, a potential group of recipient client mobile devices.

3. The method of claim 2, wherein the functional specifications of the service include management of calls from the one of the client mobile devices via the host mobile device.

4. The method of claim 3, wherein the management of calls includes:
   forwarding a call from the one of the client mobile devices and masking the identity of the one of the client mobile devices.

5. The method of claim 2, wherein the functional specifications of the service include adding a feature to the one of the client mobile devices via the host mobile device.

6. The method of claim 5, wherein the service includes:
   sending an e-mail from the host mobile device when initiated by a text message from the one of the client mobile devices.

7. The method of claim 1, further comprising:
   detecting, by the host mobile device, pending unavailability of the host mobile device to provide the service, and
   providing, to the client mobile device, a termination signal for the service.

8. The method of claim 1, wherein the validating the registration request includes soliciting input from a user of the host mobile device.

9. The method of claim 8, wherein the soliciting input from the user of the host mobile device includes providing a notification via the service-creation application.

10. The method of claim 1, wherein, when providing the service, the host mobile device communicates with the one of the client mobile device using session initiation protocol (SIP) standards.

11. The method of claim 1, wherein receiving the registration request includes receiving the registration request via a cellular network.

12. A mobile device, comprising:
    a memory to store a service-creation application and other instructions;
    a wireless transceiver to transmit and receive signals over a wireless network; and
    one or more processors configured to execute the instructions in the memory to:
        solicit, via the service-creation application and from a user, functional specifications of a service that enables the mobile device to act as a web server to provide services to client mobile devices;
        obtain executable code for implementing the functional specifications of the service;
        store, in the memory, a service-engine for hosting the service, wherein the service-engine provides the service based on the executable code;
        announce, via the wireless network, availability of the service;
        receive, in response to the announcing, a registration request from one of the client mobile devices;
        validate the registration request;
        provide, to the one of the client mobile devices and after the validating, the service via the service-engine, wherein the service adds a functionality to the one of the client mobile devices;
        detect a handoff to a cellular coverage area that cannot support the service; and
        provide, to the one of the client mobile devices, a service interruption announcement.

13. The mobile device of claim 12, wherein the one or more processors are further configured to:
    present, via the service-creation application, a user interface to define customized services for the client mobile devices.

14. The mobile device of claim 12, wherein the one or more processors are further configured to:
    solicit, from a user, a potential group of client mobile devices to which to announce the service.

15. The mobile device of claim 12, wherein, when validating the registration request, the one or more processors are further configured to:
    solicit express authorization from the user.

16. The mobile device of claim 12, wherein the one or more processors are further configured to:
    detect pending unavailability of the mobile device to provide the service, and
    provide, to the one of the client mobile devices, a termination signal for the service.

17. The mobile device of claim 12, wherein the one or more processors are further configured to:
    receive outgoing communications from the one of the client mobile devices;
    apply, to the outgoing communications, the service; and
    forward the outgoing communications to an intended recipient.

18. A non-transitory computer-readable medium comprising computer-executable instructions, the computer-readable medium comprising one or more instructions to:
    store, in a local memory, a service-creation application;
    present, via the service-creation application, a user interface to solicit a service enabling a host mobile device to act as a web server to provide services to paired client mobile devices;
    solicit, via the service-creation application and from a user, functional specifications of the service;
    obtain executable code for implementing the functional specifications of the service;
    store, in the local memory, a service-engine for hosting the service, wherein the service-engine provides the service based on the executable code;
    announce availability of the service to the client mobile devices;
    receive, in response to the announcing, a registration request from one of the client mobile devices;
    validate the registration request;
    provide, to the one of the client mobile devices, the service via the service-engine, wherein the service adds a functionality to the one of the client mobile devices;
    detect a handoff to a cellular coverage area that cannot support the service; and
    provide, to the one of the client mobile devices, a service interruption announcement.

19. The non-transitory computer-readable medium of claim 18, wherein the one or more instructions to announce availability of the service further include:
    one or more instructions to provide a link to the service-engine for providing the service.

20. The non-transitory computer-readable medium of claim 18, further comprising one or more instructions to:
    receive, from the one of the client mobile devices, user credentials for the service; and
    store, in the local memory, the user credentials with other user credentials for other temporary service accounts.

* * * * *